Patented Nov. 20, 1934

1,981,219

UNITED STATES PATENT OFFICE 1,981,219

INSECTICIDE

Edgar C. Britton and Lindley E. Mills, Midland, Mich., assignors to The Dow Chemical Company, Midland, Mich., a corporation of Michigan No Drawing. Application September 22, 1930, Serial No. 483,751

4 Claims. (Cl. 167—31)

The present invention relates to insecticidal compositions containing ortho-phenylphenol or the alkali metal and other salts thereof which are adapted for combating and exterminating sucking insects and the like.

It is known that sucking insects, such as aphis, red spider, apple sucker and capsid bug are best destroyed by means of a contact insecticide which may be prepared and applied as a spray, wash, or in other suitable manner. It is also known that such contact material may contain effective ingredients such as cyanide salts, strychnine, and nicotine, or compounds thereof. Although these insecticides are effective, they have the disadvantage of being extremely poisonous to mammals and are hazardous to use. The relatively high cost of these insecticides also limits their field of practical usefulness.

We have now found that ortho-phenylphenol and the alkali and other metal salts thereof such as those of sodium, calcium, zinc, copper, etc., are very effective contact insecticides against the above-mentioned sucking insects, particularly the aphis. Our invention ten consists of the features hereinafter fully described and particularly pointed out in the claims, the following approved combinations of ingredients embodying the invention, such disclosed combinations constituting, however, but several of the various ways in which the principle of our invention may be used.

A preferred method of preparing our new insecticide, for example, consists in emulsifying ortho-phenylphenol with a 0.2 per cent soap solution at a temperature in excess of the melting point of the ortho-phenylphenol, i. e. 56° C., so that a mixture containing about 0.2 per cent thereof is obtained. An ordinary soap, such as one containing sodium oleate may be used in the above emulsion if the spray mixture does not contain arsenate and other insecticides of that type, in which latter instance, however, a soap such as an oleate of an organic amine or a sulphonate product of a petroleum hydrocarbon is adaptable. This emulsification may be brought about by vigorous stirring or otherwise mixing the ingredients of our spray. The emulsified ortho-phenylphenol spray solution may now be sprayed onto the infested foliage or plants. When, however, the sodium salt of ortho-phenylphenol is to be used, an aqueous solution of similar concentration to that stated in the foregoing example may be prepared, with or without soap or other spreading material. Other insecticides, such as lime sulphur, lead arsenate, Bordeaux mixture, alkaloids, hydrocarbon oils, etc., may be mixed or emulsified with the foregoing emulsion or solution and be applied to trees or plants similarly as above, if desired. The ortho-phenylphenol and its salts in finely divided condition may also be mixed with the above enumerated insecticides in powdered form and applied as dust in the usual manner for such materials.

For conditions requiring an average treatment, one such application is sufficient for a practically complete kill of the live insects in from 4 to 5 hours and those hatching out for some time afterward are also exterminated by the spray remaining on the foliage. Many of the live insects, however, are killed almost instantly upon being sprayed. When extreme conditions prevail or for dormant spraying, the strength of the spray emulsion or solution may be somewhat increased. In combination with other sprays, as previously indicated, other proportions may be found applicable. The effectiveness of ortho-phenylphenol or its salts for the present purpose compares favorably in all respects with nicotine and other insecticides of similar type, and for which it may be substituted.

It is noted that the emulsifying agents or diluents or liquid vehicles when used alone or with ortho-phenylphenol or the salts thereof described above, or when combined with other insecticides or mixtures of insecticides, may have pronounced insecticidal qualities. Our insecticides may also contain small quantities of impurities, i. e. meta- and/or other phenylphenol or phenol compounds. It is understood that ortho-phenylphenol in proper fineness or condition of division may be suspended in water and in such condition applied for the purpose previously specified. Also, the soap solution or emulsion may be made up with water or oil, or other adaptable materials. As spreading agents, hard and soft soap are well adapted to be used, but other materials familiarly employed for such purpose are found equally well adapted in our plant spray. Other combinations of insecticides, diluents, emulsifying and dispersing agents suitable to be used with ortho-phenylphenol and the alkali metal salts thereof will be evident to one skilled in the art.

By the term "ortho-phenylphenol compound" as employed in the claims of the present application is meant a compound selected from the group consisting of ortho-phenylphenol and salts thereof, e. g. the sodium, calcium, zinc, copper, etc. salts of ortho-phenylphenol.

Other modes of applying the principle of our invention may be employed instead of the one explained, change being made as regards the materials disclosed, provided the ingredients stated in any of the following claims or the equivalent of such stated ingredients be employed.

We therefore particularly point out and distinctly claim as our invention:—

1. An insecticidal composition suitable for application on the foliage of plants and trees without causing injury thereto, containing an ortho-phenylphenol compound.

2. An insecticidal composition suitable for application on the foliage of plants and trees without causing injury thereto, containing an alkali metal salt of ortho-phenylphenol.

3. An insecticidal composition suitable for application on the foliage of plants and trees without causing injury thereto, containing sodium ortho-phenylphenate.

4. An insecticidal composition suitable for application on the foliage of plants and trees without causing injury thereto, containing ortho-phenylphenol.

EDGAR C. BRITTON.
LINDLEY E. MILLS.